United States Patent Office 3,442,977
Patented May 6, 1969

3,442,977
POLYMERIC BLENDS
Thomas S. Grabowski, Vienna, Va., assignor to Borg-Warner Corporation, Chicago, Ill., a corporation of Illinois
No Drawing. Filed Apr. 26, 1966, Ser. No. 545,277
Int. Cl. C09k 3/28; C08f 37/18
U.S. Cl. 260—876                    5 Claims

ABSTRACT OF THE DISCLOSURE

Flame retardant polymeric compositions comprised of chlorine and bromine substituted carboxylic acids and/or acid anhydrides combined with ABS graft polymers and chlorinated polyethylene.

---

It is well known that many of the graft polymer blends have extraordinarily desirable physical properties, however, many of them are inherently flammable and for this reason, are somewhat limited in certain applications. For example, applications which require fireproof materials, such as construction materials, are limited to flame-retardant graft polymers and blends which are flame-retardant. Many attempts have been made to render graft polymers flame-retardant by adding flame-retardant additives as well as by blending with flame-resistant materials. The addition of many of these flame-retardant materials to graft polymers has resulted in alteration of their physical and chemical properties as well as processing characteristics. Addition of some of the chlorinated materials, such as polyvinyl chloride, has also had a tendency to substantially reduce their compounding temperatures and when the graft polymers are compounded with a significant amount of chlorinated compound therein, it is also necessary to compound at comparatively low temperatures. Also, it should be noted that if normal ABS processing temperatures are utilized, a certain amount of degradation occurs in the chlorinated portion of the blending components.

It has been found that halogen-substituted carboxylic acids and/or acid anhydrides may be added to ABS graft polymers to substantially improve their flame-retardant properties with little or no change in their physical properties. These blends are described and claimed in the co-pending application Ser. No. 545,239, filed Apr. 26, 1966. It was found that the carboxylic acids and/or acid anhydrides could be blended with ABS graft polymer within the normal processing temperatures of the graft polymers. It has been found that substantial amounts of chlorinated polyethylene may be blended with ABS graft polymer and halogen-substituted carboxylic acids and/or acid anhydrides to obtain flame-retardant blends without sacrificing the highly desirable physical and chemical properties of the ABS graft polymers.

Generally stated, this invention is directed to the blending of halogen-substituted carboxylic acids and/or acid anhydrides, chlorinated polyethylene and an ABS graft polymer to improve upon the flame-retardant properties of ABS graft polymers. From about one to about 10 percent by weight of compounds that are known to contribute to flame-retardancy, such as antimony oxide and other antimony compounds, may also be added to the blends. The blends of this invention may be compounded and molded even though they contain a large amount of chlorine or bromine, at relatively high temperatures. It is especially significant that the blends of this invention may be compounded and will remain stable under normal processing temperatures. When blending the halogen-substituted carboxylic acids and/or acid anhydrides with chlorinated polyethylene and ABS graft polymers, the acid or anhydride may be blended in amounts of from about 5 percent by weight to about 40 percent by weight of the total composition and preferably from about 10 to about 30 percent by weight. The chlorinated polyethylene may be blended in amounts from about 5 percent by weight to about 50 percent by weight of the total composition and preferably from about 5 to about 30 percent by weight. The graft polymer correspondingly will comprise from about 30 percent by weight to about 90 percent by weight and preferably will comprise from about 50 percent by weight to about 80 percent by weight of the total composition. It has been found that additional flame-retardant materials or materials which contribute to flame-retardancy such as antimony oxide and other antimony compounds, may be added in amounts from about 1 percent to about 10 percent by weight of the total composition.

The chlorine and bromine substituted carboxylic acids and/or acid anhydrides of this invention may be prepared by the Diels-Adler addition of hexahalocyclopentadiene and tetrahydrophthalic anhydride or derivatives of the anhydride. The preferred method of preparing these compounds may be obtained from United States Patent 3,152,172, wherein hexachlorocyclopentadiene is reacted with tetrahydrophthalic anhydride and derivatives thereof.

The preferred halogen-subsituted dicarboxylic acid anhydride is 1,2,3,4,9,9-hexachloro-1,4,4a,5,6,7,8,8a-octahydro - 1,4 - methenonaphthalene-6,7-dicarboxylic acid anhydride. Other halo-substituted compounds such as 5,6,7,8,9,9-hexachloro-1,2,3,4,4a,5,8,8a-octahydro-5,8-metheno-2,3-naphthalenedicarboxylic acid;
5,6,7,8,9,9-hexachloro-2-carboxy-1,2,3,4,4a,5,8,8a-octahydro-5,8-metheno-2-naphthaleneacetic acid;
5,6,7,8,9,9-hexachloro-3-carboxy-1,2,3,4,4a,5,8,8a-octahydro-5,8-metheno-2-naphthaleneacetic acid;
5,6,7,8,9,9-hexachloro-1,2,3,4,4a,5,8,8a-octahydro-5,8-metheno-2-naphthalene-succinic acid;
5,6,7,8,9,9-hexachloro-1,2,3,4,4a,5,8,8a-octahydro-5,8-metheno-2-naphthalenemalonic acid;
5,6,7,8,9,9-hexabromo-1,2,3,4,4a,5,8,8a-octahydro-5,8-metheno-2,3-naphthalenedicarboxylic acid;
5,6,7,8,9,9-hexabromo-2-carboxy-1,2,3,4,4a,5,8,8a-octahydro-5,8-metheno-2-naphthaleneacetic acid;
5,6,7,8,9,9-hexabromo-1,2,3,4,4a,5,8,8a-octahydro-5,8-metheno-2-naphthalene-succinic acid, and the like may be used.

The chlorinated polyethylene that is blended with the graft polymer an halogen-substituted carboxylic acids and/or acid anhydride is a chlorinated polyethylene containing chlorine in a range of from about 20 percent to about 55 percent by weight chlorine. The chlorinated polyethylene may be derived from either a high density linear polyethylene or a low density high pressure polyethylene. The specific manner in which the polyethylene is chlorinated is not a part of this invention and various methods are well known in the art.

The graft polymers utilized in this invention are those prepared from conjugated diene, monovinyl aromatic hydrocarbon and acrylic acid nitrile monomers. A graft polymer is a polymer prepared by first polymerizing a monomer (or mixture of monomers) with subsequent polymerization of a second monomer or group of monomers onto the product of the first polymerization. The first polymerization prepares what is hereinafter referred to as the rubbery backbone.

The specific graft polymers utilized in this invention are prepared by first polymerizing a conjugated diene, such as butadiene, or a conjugated diene in the presence of a monovinyl aromatic hydrocarbon such as styrene, to provide a polymerized diene rubbery backbone such as polybutadiene or a butadiene-styrene copolymer backbone.

Thereafter, a second set of monomers are grafted to the rubbery backbone to complete the graft polymers. This is accomplished by the addition and interaction under polymerizing conditions of an acrylic acid nitrile monomer or monomers and a vinyl aromatic hydrocarbon monomer or monomers, exemplified respectively by acrylonitrile and styrene.

The backbone, i.e., conjugated diene polymer or copolymer, is prepared so as to comprise from about 60 percent to about 10 percent by weight of the total composition and the acrylic acid nitrile and aromatic monovinyl hydrocarbon that is polymerized in the presence of the backbone polymer or copolymer comprises from about 10 percent to about 90 percent by weight of the total composition.

The acrylic acid nitrile preferably comprises from about 5 percent to about 35 percent by weight of the three-component organic mixture and the monovinyl aromatic hydrocarbon comprises from about 30 percent to about 80 percent of the total composition. The term monovinyl aromatic hydrocarbon is meant to include compounds such as styrene, α-methylstyrene, vinyl toluene, vinyl xylene, ethylvinylbenzene, isopropyl styrene, chlorostyrene, dichlorostyrene, ethylchlorostyrene, mixtures thereof and the like. The acrylic acid nitrile compounds include compounds such as acrylonitrile, methacrylonitrile, ethacrylonitrile, chloroacrylonitrile, mixtures thereof, and the like.

The specific graft polymers utilized in the examples ranged from compositions containing about 10 percent by weight to about 50 percent by weight of polybutadiene with from about 20 percent to about 30 percent by weight acrylonitrile, and from about 30 percent to about 60 percent by weight styrene polymerized in the presence of polybutadiene. As mentioned, other monomers may be substituted to prepare the graft polymers, e.g., a styrene-butadiene substrate may be substituted for the polybutadiene.

The examples set forth in the table below were prepared by first polymerizing the monomers above-mentioned to prepare the graft polymer with subsequent blending of the ingredients in a Banbury mixer. The examples are meant to illustrate the blends of this invention and are not intended to limit the generally broad scope thereof. All parts are by weight unless otherwise indicated.

TABLE 1

|  | 1 | 2 | 3 | 4 | 5 | 6 | 7 | 8 | 9 | 10 | 11 | 12 |
|---|---|---|---|---|---|---|---|---|---|---|---|---|
| Graft polymer—51% styrene, 29% acrylonitrile, 20% butadiene | 80 | 70 | 65 | 65 | 60 | 55 | 55 | 50 | 50 | 50 | 45 | 40 |
| Chlorinated polyethylene, 40% chlorination | 10 | 15 | 10 | 25 | 20 | 15 | 30 | 25 | 40 | 10 | 50 | 30 |
| 1,2,3,4,9,9-hexachloro-1,4,4a,5,6,7,8,8a-octahydro-1,4-methenonaphthalene-6,7-dicarboxylic anhydride | 10 | 15 | 25 | 10 | 20 | 30 | 15 | 25 | 10 | 40 | 5 | 30 |
| Dibutyl tin maleate | 2.0 | 2.0 | 2.0 | 2.0 | 2.0 | 2.0 | 2.0 | 2.0 | 2.0 | 2.0 | 2.0 | 2.0 |
| Lubricant | 0.5 | 0.5 | 0.5 | 0.5 | 0.5 | 0.5 | 0.5 | 0.5 | 0.5 | 0.5 | 0.5 | 0.5 |
| Flammability ASTM D-636-56T | [1].98 | NB | NB | SB | NB | NB | NB | NB | NB | NB | NB | NB |
| Tensile ⅛″ type 1 ASTM D-638-61T | 5,750 | 4,900 | 4,750 | 4,250 | 4,200 | 4,200 | 3,350 | 3,150 | 3,300 | 3,700 | 3,350 | 2,500 |
| Elongation (percent) | 25 | 30 | 9 | 220 | 55 | 5 | 77 | 50 | 258 | 3 | 252 | 45 |
| Tensile modulus ASTM D-256-56, method A | 3.0 | 2.6 | 3.8 | 2.4 | 2.9 | 3.0 | 2.2 | 2.2 | 1.4 | 4.3 | 1.4 | 1.9 |
| Hardness, Rockwell R scale, ASTM D-785-62 | 96 | 90 | 94 | 80 | 79 | 85 | 70 | 67 | 50 | 87 | 47 | 47 |

[1] Burn rate in inches per minute.
NB—Non-burning, SE—Self-extinguishing.

TABLE 2

|  | 13 | 14 | 15 | 16 | 17 | 18 | 19 | 20 |
|---|---|---|---|---|---|---|---|---|
| Graft polymer—57% styrene, 31% acrylonitrile, 12% butadiene | 100 | 80 | 60 | 40 |  |  |  |  |
| Graft polymer—35% styrene, 18% acrylonitrile, 47% butadiene |  |  |  |  | 100 | 80 | 60 | 40 |
| Chlorinated polyethylene, 40% chlorination |  | 10 | 20 | 30 |  | 10 | 20 | 30 |
| 1,2,3,4,9,9-hexachloro-1,4,4a,5,6,7,8,8a-octahydro-1,4-methenonaphthalene-6,7-dicarboxylic anhydride |  | 10 | 20 | 30 |  | 10 | 20 | 30 |
| Dibutyl tin maleate | 2.0 | 2.0 | 2.0 | 2.0 | 2.0 | 2.0 | 2.0 | 2.0 |
| Lubricant | 0.5 | 0.5 | 0.5 | 0.5 | 0.5 | 0.5 | 0.5 | 0.5 |
| Flammability ASTM D-636-56T | [1]1.55 | .88 | NB | NB | 1.51 | .90 | NB | NB |
| Tensile ⅛″ type 1 ASTM D-638-61T | 7,800 | 7,225 | 4,500 | 3,300 | 2,100 | 2,100 | 1,700 | 1,300 |
| Elongation (percent) | 20 | 15 | 20 | 80 | 150 | 245 | 210 | 95 |
| Tensile modulus ASTM D-256-56, method A | 4.0 | 3.7 | 3.0 | 2.6 | 1.1 | 1.1 | 1.0 | 0.7 |
| Hardness, Rockwell R scale, ASTM D-785-62 | 112 | 106 | 92 | 59 | [2]63 | [2]61 | [2]62 | [2]60 |

[1] Burn rate in inches per minute.
[2] Hardness Shore D ASTM D-1706-59T.
NB—Non-burning.

TBLE 3

|  | 21 | 22 | 23 | 24 | 25 | 26 | 27 | 28 | 29 |
|---|---|---|---|---|---|---|---|---|---|
| Graft polymer—51% styrene, 29% acrylonitrile, 20% butadiene | 80 | 60 | 40 | 80 | 60 | 40 | 80 | 60 | 40 |
| Chlorinated polyethylene, 40% chlorination | 10 | 20 | 30 | 10 | 20 | 30 | 10 | 20 | 30 |
| 1,2,3,4,9,9-hexachloro-1,4,4a,5,6,7,8,8a-octahydro-1,4-methenonaphthalene-6,7-dicarboxylic anhydride | 10 | 20 | 30 | 10 | 20 | 30 | 10 | 20 | 30 |
| Antimony oxide | 1 | 1 | 1 | 7 | 7 | 7 | 10 | 10 | 10 |
| Dibutyl tin maleate | 2.0 | 2.0 | 2.0 | 2.0 | 2.0 | 2.0 | 2.0 | 2.0 | 2.0 |
| Lubricant | 0.5 | 0.5 | 0.5 | 0.5 | 0.5 | 0.5 | 0.5 | 0.5 | 0.5 |
| Flammability ASTM D-636-56T | [1]1.04 | NB | NB | NB | NB | NB | NB | NB | NB |
| Tensile ⅛″ type 1, ASTM D-638-61T | 5,800 | 4,300 | 2,600 | 5,400 | 4,300 | 2,500 | 5,400 | 4,400 | 2,550 |
| Elongation (percent) | 20 | 26 | 40 | 15 | 15 | 60 | 12 | 20 | 50 |
| Tensile modulus ASTM D-256-56, method A | 3.5 | 3.3 | 2.4 | 3.4 | 3.4 | 2.2 | 3.4 | 3.5 | 2.3 |
| Hardness, Rockwell R scale, ASTM D-785-62 | 96 | 83 | 52 | 97 | 83 | 54 | 96 | 84 | 49 |

[1] Burn rate in inches per minute.
NB—Non-burning.

TABLE 4

|  | 30 | 31 | 32 | 33 | 34 | 35 | 36 | 37 |
|---|---|---|---|---|---|---|---|---|
| Graft polymer—51% styrene, 29% acrylonitrile, 20% butadiene | 90 | 80 | 60 | 40 | 90 | 80 | 60 | 40 |
| Chlorinated polyethylene containing 53% chlorine | 5 | 10 | 20 | 30 | | | | |
| Chlorinated polyethylene containing 25% chlorine | | | | | 5 | 10 | 20 | 30 |
| 1,2,3,4,9,9-hexachloro-1,4,4a,5,6,7,8,8a-octahydro-1,4-methenonaphthalene-6,7-dicarboxylic anhydride | 5 | 10 | 20 | 30 | 5 | 10 | 20 | 30 |
| Dibutyl tin maleate | 2.0 | 2.0 | 2.0 | 2.0 | 2.0 | 2.0 | 2.0 | 2.0 |
| Lubricant | 1.0 | 1.0 | 1.0 | 1.0 | 1.0 | 1.0 | 1.0 | 1.0 |
| ASTM flammability [1] ASTM D-636-56T | 1.03 | 0.93 | NB | NB | 1.05 | 0.88 | NB | NB |
| Tensile ⅛" type 1, ASTM D-638-61T | 6,100 | 6,100 | 4,900 | 4,300 | 5,650 | 4,300 | 1,700 | 775 |
| Elongation (percent) | 10 | 7 | 4 | 3 | 15 | 7 | 3 | 4 |
| Tensile modulus ASTM D-256-56, method A | 3.0 | 3.2 | 3.6 | 4.0 | 2.9 | 2.6 | 2.0 | 1.0 |
| Hardness, Rockwell R scale, ASTM D-785-62 | 105 | 106 | 102 | 98 | 100 | 94 | [2] 70 | [2] 58 |

[1] Results are recorded in inches/minute of burn rate or NB (non-burning).
[2] Shore D hardness ASTM D-1706-59T.

In the examples, the polymeric blends were prepared from graft polymers containing polybutadiene rather than butadiene-styrene copolymers, however, as indicated, these graft polymers are equally applicable to this invention. It will be noted that the physical properties are not greatly altered through addition of high chlorine content materials and the flame-retardancy of the resulting blend is far superior to that of the graft polymers by themselves.

It should be understood that while this invention has been described in connection with certain specific blends containing specific amounts of chlorinated anhydrides, ABS graft polymers, and chlorinated polyethylene, that this is by way of illustration and not limitation, and that the scope of the invention is defined solely by the appended claims which should be construed as broadly as is consistent with the prior art.

I claim:

1. A thermoplastic flame-retardant blend comprising from about 5 percent to about 40 percent by weight of chlorine and bromine substituted carboxylic acids and/or acid anhydrides selected from the group consisting of 1,2,3,4,9,9-hexachloro-1,4,4a,5,6,7,8,8a-octahydro-1,4-methanonaphthalene-6,7-dicarboxylic acid anhydride;

5,6,7,8,9,9-hexachloro-1,2,3,4,4a5,8,8a-octahydro-5,8-methano-2,3-naphthalenedicarboxylic acid;

5,6,7,8,9,9-hexachloro-2-carboxy-1,2,3,4,4a,5,8,8a-octahydro-5,8-methano-2-naphthaleneacetic acid;

5,6,7,8,9,9-hexachloro-3-carboxy-1,2,3,4,4a,5,8,8a-octahydro-5,8-methano-2-naphthaleneacetic acid;

5,6,7,8,9,9-hexachloro-1,2,3,4,4a,5,8,8a-octahydro-5,8-methano-2-naphthalenesuccinic acid;

5,6,7,8,9,9-hexachloro-1,2,3,4,4a,5,8,8a-octahydro-5,8-methano-2-naphthalenemalonic acid;

5,6,7,8,9,9-hexabromo-1,2,3,4,4a,5,8,8a-octahydro-5,8-methano-2,3-naphthalenedicarboxylic acid;

5,6,7,8,9,9-hexabromo-2-carboxy-1,2,3,4,4a,5,8,8a-octahydro-5,8-methano-2-naphthaleneactetic acid; and 5,6,7,8,9,9-hexabromo-1,2,3,4,4a,5,8,8a-octahydro-5,8-methano-2-naphthalene-succinic acid, from about 30 percent to about 90 percent by weight of a conjugated diene-monovinyl aromatic hydrocarbon-acrylic acid nitrile graft polymer, and from about 5 percent to about 50 percent by weight chlorinated polyethylene containing from about 20 percent by weight to about 55 percent by weight chlorine.

2. The thermoplastic flame-retardant blend of claim 1 wherein the chlorine and bromine substituted carboxylic acids and/or acid anhydrides comprise from about 10 to about 30 percent by weight of the total composition, the chlorinated polyethylene comprises from about 10 percent to about 30 percent by weight of the total composition, and the graft polymer comprises from about 40 percent to about 80 percent by weight of the total composition.

3. The thermoplastic blend of claim 1 wherein the graft polymer is prepared by polymerizing from about 40 percent to about 90 percent by weight of a monovinyl aromatic hydrocarbon and an acrylic acid nitrile in the presence of from about 10 percent to about 60 percent by weight of a polymerized product selected from the group consisting of conjugated diene homopolymers, and conjugated diene-monovinyl aromatic hydrocarbon copolymers.

4. The thermoplastic blend of claim 1 wherein the chlorine and bromine substituted dicarboxylic acid anhydride is 1,2,3,4,9,9 - hexachloro-1,4,4a,5,6,7,8,8a - octahydro-1,4-methanonaphthalene-6,7-dicarboxylic acid anhydride.

5. The thermoplastic blend of claim 1 wherein a flame-retardant material is added in an amount from about 1 percent to about 10 percent by weight of the total composition, said material selected from the group consisting of antimony oxide and antimony-containing materials which contribute flame-retardancy.

References Cited

UNITED STATES PATENTS

| 2,967,842 | 1/1961 | Roberts | 260—880 XR |
| 3,152,172 | 10/1964 | Roberts et al. | 260—346.6 XR |
| 3,269,963 | 8/1966 | Ilgemann et al. | 260—876 XR |
| 3,288,813 | 11/1966 | Kleiman | 260—45.8 XR |
| 3,365,470 | 1/1968 | Schmerling | 260—346.6 |

GEORGE F. LESMES, *Primary Examiner.*

U.S. Cl. X.R.

260—45.7, 45.8, 45.75, 346.6